April 23, 1957
C. B. MARBLE
2,789,412
ELECTRIC CLOCK
Filed Nov. 2, 1954
2 Sheets-Sheet 1
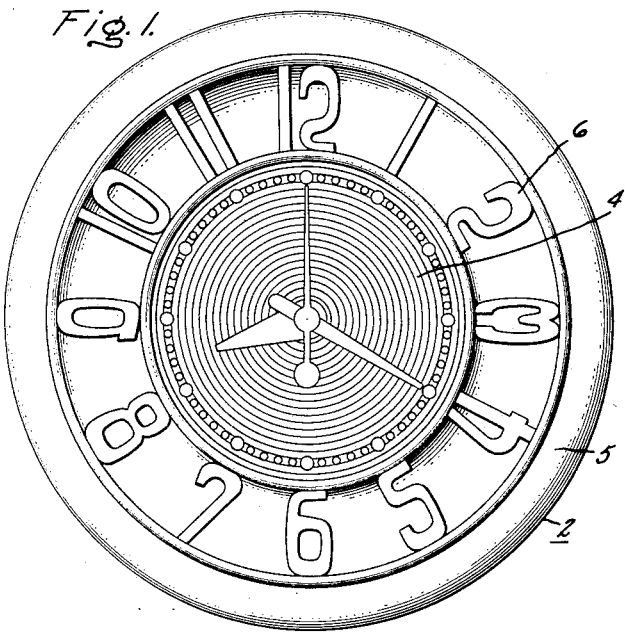
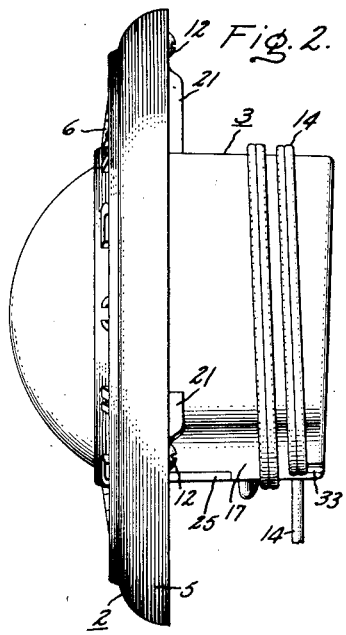
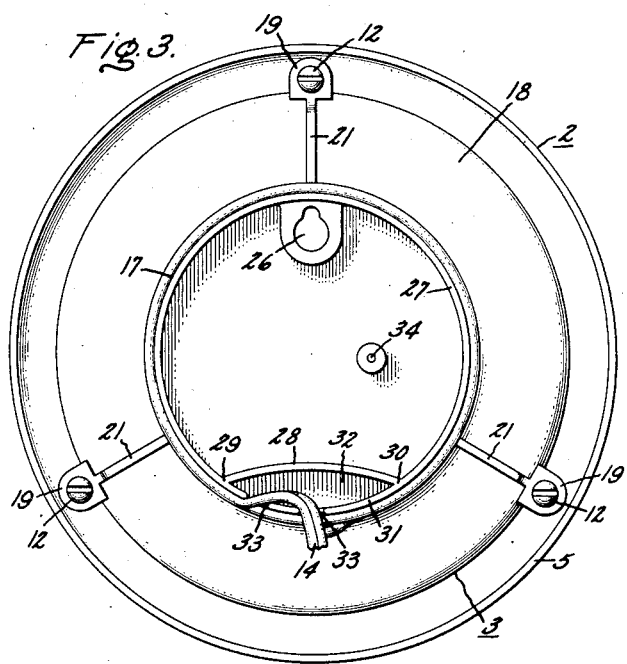
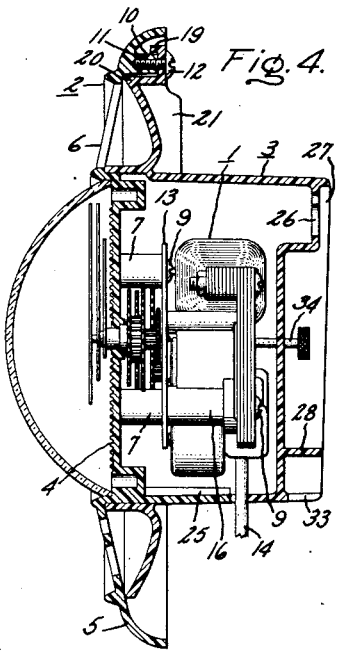
Inventor:
Chester B. Marble,
by Frank L. Neuhauser
His Attorney.

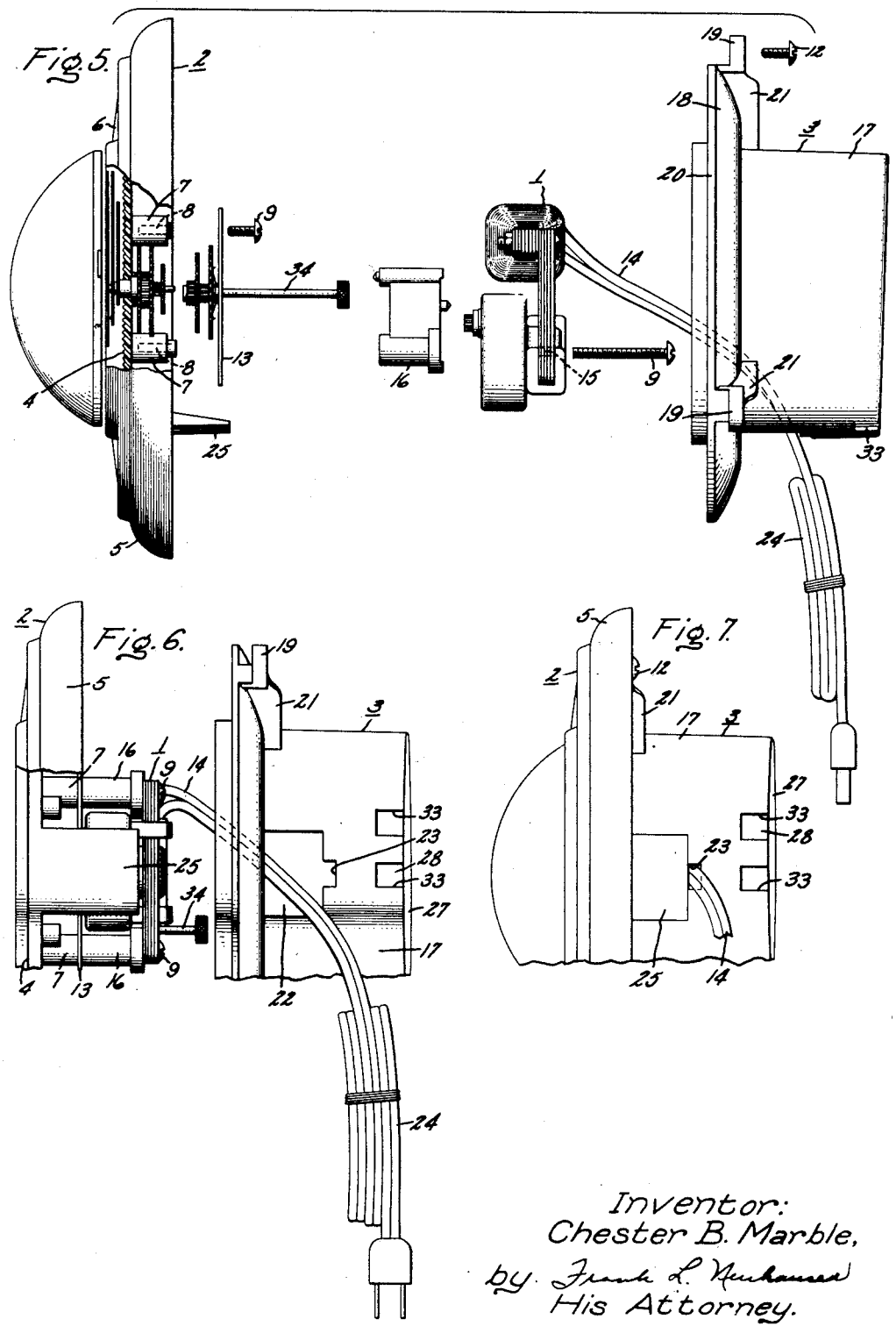

United States Patent Office 2,789,412
Patented Apr. 23, 1957

2,789,412

ELECTRIC CLOCK

Chester B. Marble, Ashland, Mass., assignor to General Electric Company, a corporation of New York Application November 2, 1954, Serial No. 466,371

3 Claims. (Cl. 58—53)

My invention relates to clocks and more particularly to electric clocks.

In electric clocks, aside, of course, from the desirability of perfect timekeeping, appearance and cost are major considerations in market acceptance. In the case of kitchen clocks, the cost consideration is a particularly important one, since this is a highly competitive market and one in which the consumer is unwilling to pay a particularly high price.

In previous electric clocks with which I am familiar, it has been the general practice to provide a dial plate, a bezel, a surrounding decorative framework of some sort, a movement mounting plate behind the dial plate secured in some manner thereto, a plurality of movement mounting studs secured, for example, by riveting to this movement mounting plate, a plurality of spacer studs also supported in some manner from the mounting plate, a casing for the motor and gear mechanism, means for connecting the casing to the front portion of the clock, and to the spacer studs. The cost of providing this multitude of individual elements, and more importantly the cost of assembling the elements in the proper relationship was substantial. Also, of course, the problem, from the standpoint of manufacturing quality, of maintaining the proper tolerances between the many parts in their assembled relationship was a significant one.

Because of limitations on case design, it has sometimes been necessary to thread the electric cord through the back cover of the casing before assembly of this back cover or casing in order to avoid holes of hazardous size through the casing. In some cases, the ends of the cord were then soldered to the winding of the electric motor and the back cover or casing then assembled. This, of course, prevented a manufacturing subassembly arrangement in which the electric motor complete with its hanked cord and plug could be separately manufactured and then in a final operation placed in a previously prepared clock casing. Alternatively, the electric motor complete with the cord was prepared but it was then necessary to leave off the plug so that the end of the cord could be threaded through the opening of limited diameter in the clock casing or back cover. This, of course, necessitated the separate operation of adding a plug to the end of the cord after the clock was completed and prevented the use of the convenient and more economical molded cord and plug. Also, it, of course, prevented making the electric motor complete with its final cordset in a subassembly operation.

I have overcome the deficiencies of the prior art outlined above. In the first place, by my invention the dial plate, the movement front plate, the surrounding decorative framework including the hour numerals, and supporting studs for mounting the clock mechanism and for attaching the casing have been formed in a simple one-piece molded construction which both reduces the cost substantially and also positively locates a number of the points of the structure in a fixed relationship which minimizes the problem of manufacturing tolerances. I have eliminated entirely the need for the spacer studs for the back cover of the clock and I have arranged instead to make the enclosing casing for the motor and gear assembly of the clock of a one-piece molded construction which is assembled easily by means of simple self-threading screws onto the aforementioned front member. I have also formed this back casing member so as to include, as will be described in detail later, a conveniently disposed curved annular element which provides a suitable background for the clock numerals.

Finally in order to overcome the aforementioned deficiency with regard to assembly of the cord in a manner to meet safety requirements, I have formed the one-piece molded front member to include a rearwardly extending tongue of substantial width. The back of the casing is formed to include along the bottom cylindrical portion thereof an opening of corresponding size having only a small recess extending from a rear portion thereof. Thus, after the clock mechanism has been assembled on the one-piece front member in the easy manner referred to above, the cord in hanked form, including its regular molded plug, can be easily passed through this large opening in the back casing. When the back casing and the front member are moved into assembled relationship, the aforementioned tongue closes the large opening except for the small recess at the rear end thereof which is of just sufficient size to permit passage of the cord in full compliance with recognized safety requirements.

Accordingly it is an object of my invention to provide an improved electric clock construction in which the cost is greatly reduced and the manufacturing operations substantially simplified.

It is another object of my invention to provide an electric clock in which the problem of manufacturing tolerances is minimized.

It is another object of my invention to provide an electric clock in which the electric motor including its complete hanked cordset may be formed as a subassembly and the hanked cord passed through the enclosing back casing of the clock during final assembly, with the resultant final opening still complying with recognized safety requirements.

Further objects and advantages of my invention will become apparent as the following description proceeds and the features of novelty which characterize my invention will be pointed out with particularity in the claims annexed to and forming part of this specification.

For a better understanding of my invention, reference may be made to the accompanying drawings in which Fig. 1 is a front elevation view of a clock including an embodiment of my invention.

Fig. 2 is a side elevation view.

Fig. 3 is a rear elevation view.

Fig. 4 is a sectional elevation view.

Fig. 5 is an exploded view looking at one side of the clock.

Fig. 6 is a partially exploded view of a portion of the clock looking at the bottom of the clock.

Fig. 7 is a view corresponding to Fig. 6 but showing the parts in the assembled position thereof.

In carrying out the objects of my invention the entire front structure of the clock is made from a single molded member which includes the dial plate, the clock numerals, a decorative frame, the movement front plate, and rearwardly extending studs for mounting the clock mechanism and for mounting the enclosing back casing. The back casing of the clock is similarly molded in a one-piece construction which includes a cylindrical clock mechanism enclosing portion, and a surrounding flange which also provides a background for the spaced numerals of the clock. The back casing includes a large opening and the front member includes a cooperating tongue which closes this opening after passage of the hanked cordset therethrough except for a small recess at the rear end thereof of substantially the same dimensions as the cross section of the cord.

Referring to the drawings, the clock of my invention includes clock mechanism, comprising an electric motor and associated mechanism, generally indicated at 1, and two one-piece molded members 2 and 3 associated therewith to form the completed clock. The front member 2 includes the dial plate 4 of the clock, a surrounding annular flange 5 concentric with the dial plate, and a plurality of clock numerals, indicated at 6, connecting the dial plate and the surrounding decorative annular flange. The one-piece molded front member 2 also includes, molded integral therewith, a plurality of clock mechanism mounting studs 7 extending rearwardly from the back side thereof. These studs include elongated recesses 8 in the rear thereof which are adapted to receive self-threading screws 9 for mounting the clock mechanism 1 conveniently and firmly on the rear of the front member. This front member further includes a plurality of annularly spaced rearwardly extending studs 10, also molded integrally with the front member, which are employed for mounting the back casing 3 onto the front member. As in the case of the studs 7, these studs 10 include in the rear thereof elongated recesses 11 for receiving self-threading screws 12 to assemble the back casing onto the front member. This encloses the clock mechanism and completes the assembly of the clock.

The front member is preferably molded from a chemical resistant polystyrene material known as type C–11, which both presents a decorative finished appearance for the clock and also allows the use of the self-threading screws in the aforementioned elongated holes without danger of cracking the material. It is further advantageous to employ this construction since the screws engaging this polystyrene material are found to make and maintain a very tight engagement with the material so that the parts are securely mounted in place. The self-threading screws are believed to soften the plastic to some extent as they are screwed in place and the plastic then solidifies about the threads to assume a firm assembly.

In assembling the structure the base plate 13 is mounted on one of the studs 7 by one of the screws 9. The remainder of the motor assembly, including the complete cordset 14 attached to the motor as part of the subassembly operation, is then mounted on the plate 13 and the remaining two studs 7 by means of the remaining two screws 9 which extend through passages 15 in the motor structure, through spacers 16, and into engagement with the elongated recesses in these remaining two studs. Self-threading screws are also employed for this purpose.

It can thus be seen that a single one-piece molded member 2 serves as the dial plate, the clock numeral element, the decorative surrounding portion of the clock, the movement front plate, and also provides mounting studs for both the clock mechanism and for the enclosing back casing of the clock. It has been the common practice in manufacturing clocks to provide a dial plate, some decorative surrounding member or frame, a metal movement front plate secured in some manner to the dial plate or frame adjacent the rear surface of the dial plate, motor mounting studs riveted or otherwise secured to this metal plate and spacer studs also secured in some manner to the metal plate for supporting the back plate of the casing of the clock. It can be seen that in normal practice a large number of separate elements were required to serve the functions which are all incorporated in the single front member 2 of the applicant's construction. Moreover, the assembly of the multitude of separate elements, aside from the substantially higher cost of the elements themselves, requires a substantial number of manufacturing operations thus adding greatly to the cost of the clock compared to that involved in the applicant's construction.

In the applicant's simplified construction on the other hand, all these parts are successively replaced by the single one-piece molded plastic member 2. Moreover, making these parts all from the single molded member with the clock mechanism mounting studs and the back casing mounting studs molded integrally therewith automatically assures the accurate positioning of these parts, minimizing the problem of manufacturing tolerances and insuring the correct final assembly of the clock mechanism and the back casing.

In accordance with the applicant's invention the back casing of the clock is also simplified, being formed in a single one-piece molded plastic construction, as indicated by 3. This member 3 includes a cylindrical portion 17 which substantially encloses the clock mechanism and a surrounding curved annular flange 18. Extending outwardly from the annular flange are three radially spaced ears 19 which are, of course, also molded as integral portions of the back casing member 3. These ears 19 include openings for passage of the screws 12 referred to previously for effecting the assembly of the back casing onto the front member 2. The ears 19 are arranged in a plane rearward of the outer edge 20 of the annular flange 18 so that the ears may be mounted on the rearwardly extending studs 10 while still leaving the outer edge of the flange 18 disposed closely adjacent the face of the front member 2. In order to support and strengthen the rearwardly positioned ears 19, a rib 21 is provided extending between the cylindrical portion 17 of the back casing and each of the ears 19. Each rib 21 extends rearwardly from the annular flange 18 and is formed integral with the flange, the cylindrical portion 17, and the corresponding one of the ears 19.

The curved annular member 18 is, in the assembled position of the clock elements, positioned directly to the rear of and spaced a significant distance from the clock numerals 6. The casing 3 including the annular member 18 may be molded from plastic of any suitable color or colors and the member 18 thereby provides an accenting colored background for the numerals. The front member 2 including the numerals is preferably molded of a material of a contrasting color, for example, a lighter color, such as white, which contrasts against a darker background such as blue or red, employed for the back casing and the annular ring 18.

It can be seen that the final assembly operation in manufacturing the clock is easily and economically performed using the structure of my invention. The members 2 and 3 are, as mentioned above, each molded as a one-piece structure. The clock mechanism 1 is formed as a separate subassembly and is easily and accurately mounted along with the base plate 13 on the integrally molded studs 7 of the front member 2 by means of the simple self-threading screws 9 which firmly engage with the plastic of the member 2. The back casing 3 is then assembled by means of the self-threading screws 12 enclosing the clock mechanism and completing the assembly. The one-piece molded construction of the members, and particularly of the multiple function front member, reduces greatly the separate elements required and the separate assembly operations required in the manufacturing process and in the final assembly of the clock structure. The cost is thereby then substantially reduced, and moreover accurate positioning of the elements because of the one-piece construction is facilitated.

Another problem overcome by the applicant's construction is that associated with the electric cord in the final assembly of the clock structure. To meet safety requirements, it is necessary that the opening for the cord in the clock casing be of a certain minimum size not substantially exceeding the size of the cord itself. Thus, this opening is, of course, much smaller than either the motor or the plug of the cord, and neither of these elements can successfully pass through an opening which meets recognized safety requirements. Hence, it has previously been necessary in clocks of the general structure used by the applicant to provide an opening of the required minimum size in the clock casing, then to thread the end of the cord through this opening during the assembly operation. In one form of assembly the bare ends of the cord would then be soldered to the windings of the motor during this final assembly. In another form the cord is soldered to the winding of the motor during the subassembly operation but the plug is not included on the end of the cord. The cord may then be threaded through the opening in the casing and the plug then added to the cord. The plug is thus separately added to the end of the cord after the completion of the clock assembly. This, of course, is undesirable since it prevents the utilization of the molded plug and cord assembly and prevents the incorporation of the completed cordset with the electric motor during the subassembly operation.

In accordance with my invention an opening of substantial size, sufficient to permit the passage not only of the plug but also of the complete cord in hanked form therethrough is provided in the back casing. A cooperating tongue is provided on the front member 2 which automatically closes this opening except for a small recess meeting safety requirements, during the natural final assembly of the front member and the back casing of the clock. Specifically the back casing 3 is molded to include at the bottom portion of the cylindrical section 17 thereof a large opening 22. This opening 22 is further formed to include a small recess 23 at the rear end thereof of a size approximating a cross-sectional dimension of the cord. This opening, as is shown clearly in Figs. 6 and 7, is of such size that the hanked cord, indicated at 24, may be easily passed therethrough without even unhanking the cord. Since the cordsets received from outside vendors, or even those manufactured in a separate operation in the same plant, are usually hanked during manufacture, it is a convenience and, of course, a reduction in cost to be able to assemble the cord in this manner without unhanking the cord and then being forced to rehank it for incorporation in the shipping package in the normal manner. By utilizing the applicant's construction, it can be seen that the complete cordset may have its ends soldered to the winding of the motor during the subassembly operation of the motor itself and then this structure easily assembled into the clock casing during the final assembly of the clock.

The opening 22 is of course, relative to the cord, much too large to conform to recognized safety requirements. However, this difficulty is easily overcome in the applicant's structure by forming the front member 2 to include a rearwardly extending tongue 25 at the lower portion thereof. This tongue 25 is molded integral with the front member and is substantially the same size as the opening 22 in the back casing. During the final assembly of the back casing onto the front member to enclose the clock mechanism, the tongue 25 is received within and completely fills the large opening 22 leaving open only the small recess 23 at the rear portion thereof. This recess, as mentioned above, is only slightly larger than the cross section of the cord, and the cord easily fits therein. The dimensional relationship of this recess and the cord is such as to completely satisfy recognized safety requirements.

It is realized that back covers of clocks, radios and other appliances have previously been made with, for example, a notch along one edge thereof adjacent the main casing of the appliance so that the cord in its hanked form attached to the mechanism can be assembled within the surrounding casing, and the back plate then assembled with the cord will be received within this notch. However, such a construction could not be utilized with the applicant's simplified front member and back casing arrangement since the back casing, to satisfy the applicant's requirements for simplified construction, includes not only a simple back plate which could have a notch along its perimeter or a simple cylindrical back casing which similarly could have a notch at the junction of the casing and the front member but also includes the surrounding annular flange 18 formed integrally therewith. The applicant has preserved the economy, convenience and simplicity of his one-piece molded construction and at the same time has afforded a way of permitting passage of the hanked cord while still keeping the final opening substantially the size of the cord cross-section, by providing the large opening in the back casing and then automatically closing the opening during the final assembly. This is accomplished by providing the tongue 25 molded integrally with the front member, the tongue being automatically received in the opening 22 during final assembly and closing this opening. No special closure members are required.

As shown in the drawing, the applicant's molded back casing is also shaped to include a keyhole slot 26 formed in a member molded integrally with the back casing. The slot 26 enables the clock to be easily mounted on a wall support. Further, there is provided a rearwardly extending circular flange 27 the rear edge of which is adapted to engage flush against the wall and within the confines of which the keyhold slot 26 is recessed. A rib 28 of substantially the same height as the circular flange 27 is provided near the bottom of the back casing extending between two spaced points 29, 30 on the circular flange. This rib 28 is molded integrally with the circular flange 27 and with the back wall of the casing 3. The rib 28 and the portion 31 of the circular flange between the points 29, 30 together form a confined space 32 for receiving a loop of the cord 14.

It will be appreciated that varying lengths of cord are required for clocks depending upon the location of the clock relative to the convenience outlet. From an appearance standpoint it is desirable that the length of the dangling cord be minimized. By the applicant's simplified arrangement the excess cord may be easily wound around the drum formed by the cylindrical section 17 of the back casing and the cord then looped through to notches 33 provided in the circular flange 27 along the portion 31 thereof. The engagement of the cord with the notches 33 prevents unraveling of the cord from the drum. Thus a cord of any desired effective length between the plug and the clock can be easily achieved without additional cost in the regular molding operation of the back casing. The rib 28 confines the loop of the cord to the space 32 and prevents the cord from inadvertently being engaged over the rotating shaft 34 which projects from the back wall of the casing 3. Should the cord inadvertently become looped about this shaft and thereby apply a frictional resistance thereto, it might impose a drag on the clock mechanism and thereby cause the clock to lose time.

While I have shown and described a specific embodiment of my invention, I do not desire my invention to be limited to the particular construction as shown and described and I intend by the appended claims to cover all modifications within the spirit and scope of my invention.

What I claim as new and desire to secure by Letters Patent of the United States is:

1. A clock including a clock mechanism and a housing therefor, said clock mechanism including a hanked electrical cord attached thereto, a one-piece plastic front member and a one-piece back casing, said back casing including a rearwardly extending portion and an annular flange surrounding said portion at the forward end thereof and formed integral therewith, said rearwardly extending portion having an enlarged opening therein adjacent the intersection of said portion and said flange, said opening being of sufficient size to afford passage of said hanked electrical cord, said opening further including a recess at the rear edge thereof of a size only slightly larger than the cross-section of said electrical cord, said front member including a rearwardly extending tongue formed integral therewith, said tongue being aligned with said opening and being of substantially the same size as said opening exclusive of said recess, whereby after said hanked cord has been passed through said enlarged opening said back casing may be assembled on said front member and said tongue closes said opening with said cord passing through said recess, and means for mounting said back casing on said front member.

2. A clock including a clock mechanism and a housing therefor, comprising a one-piece plastic front member and a one-piece back casing, said back casing including a rearwardly extending portion and an annular flange surrounding said portion at the forward end thereof and formed integral therewith, said rearwardly extending portion having an enlarged opening therein adjacent the intersection of said portion and said flange to allow a hanked cord to be passed therethrough, said back casing also having a plurality of smaller openings therein, said front member including a plurality of rearwardly extending studs and a rearwardly extending tongue formed integral therewith, said tongue being of substantially the same size as said enlarged opening whereby said tongue may be slid within said opening thereby closing said enlarged opening and aligning said studs with said smaller openings.

3. A clock including a clock mechanism and a housing therefor, comprising a one-piece plastic front member and a one-piece back casing; said front member including a plurality of rearwardly extending studs integral therewith; said back casing including a cylindrical portion and an annular flange surrounding said cylindrical portion at the forward end thereof and formed integrally therewith; said back casing further including a plurality of integral ears extending radially outwardly from said flange and in spaced relationship about the circumference thereof; said ears being aligned with said first-named studs, each of said ears having an opening therein; each of said first-named studs having a rearwardly facing elongated recess formed therein aligned with said openings; a self-threading screw passing through each of said openings and engaging the recess in the corresponding stud for assembling said back casing to said front member; said ears being disposed in a plane rearward of the outer edge of said annular flange; a rearwardly extending rib extending adjacent the rear surface of said annular flange and extending between said cylindrical portion and each of said ears; each of said ribs being formed integral with said cylindrical portion, said annular flange and the corresponding one of said ears.

References Cited in the file of this patent
UNITED STATES PATENTS

| Number | Name | Date |
|---|---|---|
| 2,001,588 | Sprague | May 14, 1935 |
| 2,244,619 | Heise et al. | June 3, 1941 |
| 2,254,599 | Carlson | Sept. 2, 1941 |
| 2,638,735 | Schlenker | May 19, 1953 |
| 2,644,853 | Berninger | July 7, 1953 |
| 2,660,857 | Burghoff | Dec. 1, 1953 |